Aug. 28, 1962 T. J. PARKER 3,050,896
FISHING TOOL
Filed June 20, 1960

INVENTOR.
TRENT J. PARKER
BY M. Ralph Shaffer
HIS ATTORNEY

3,050,896
FISHING TOOL
Trent J. Parker, 7880 Laurelhurst Drive,
Salt Lake City, Utah
Filed June 20, 1960, Ser. No. 37,200
2 Claims. (Cl. 43—4)

This invention relates to tools having extensible and withdrawable work members and, more particularly, to a fishing tool for threading minnows which is extremely versatile and yet easy to carry.

An object of the present invention is to provide a new and useful hand tool wherein the work member thereof is selectively extensible and withdrawable in a very easy manner.

An additional object of the present invention is to provide a new and useful fishing tool which is easily carried when the work member thereof is withdrawn and yet which is highly effective in threading minnows, for example, when the work member thereof is extended.

An additional object of the present invention is to provide a minnow threading tool and novel needle therefor which are of unique design so as to facilitate easy threading of minnows with conventional, looped fishing leaders, and with the tool itself being extremely simple to use.

According to the present invention the tool includes a holder, which resembles a mechanical pencil, plus a work member in the form of a needle having a uniquely configured end. The holder differs from the conventional mechanical pencil in that, in the present invention, the jaw means thereof is threaded or otherwise secured within the forward end of the holder sleeve so that the end of the jaw means may serve as an abutment for stop means associated with the needle. This stop means generally comprises an enlarged button slideable within the sleeve of the holder and yet engageable with the end of the jaw means. Otherwise, the holder is substantially the same as conventional mechanical pencil designs. The jaw means thereof is conventional, except for its means and manner of attachment to the sleeve of the holder, and comprises a unitary part of resilient material, the same exhibiting a plurality of jaw fingers. These fingers are interiorly serrated and circumferentially contain the work member or needle employed.

The work member of the tool of the present invention preferably comprises a needle having a forked end for receiving the loop end of a fishing leader. This forked end of the needle preferably is tapered so as to accommodate easy insertion and penetration through a minnow while yet retaining sufficient needle diameter to insure proper retention by the jaw means of the holder.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
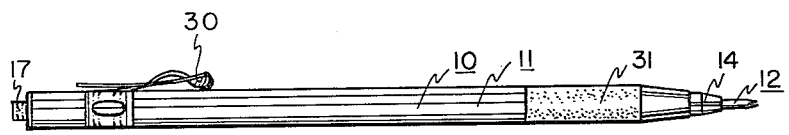
FIGURE 1 is an elevation of the tool of the present invention in horiozntal position when the needle thereof is in retracted or withdrawn position.
Figure 2:
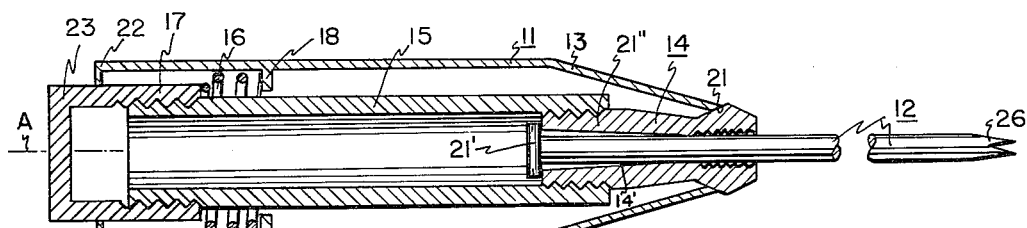
FIGURE 2 is a vertical section of the tool of FIGURE 1 with the needle thereof being shown in extended position and the whole being slightly enlarged in size, widthwise, so that the details of the invention may be perceived with ease.
Figures 3, 4:
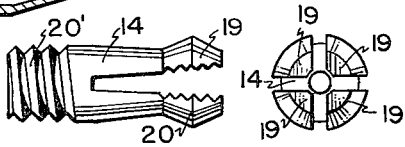
FIGURES 3 and 4 are elevation and front views, respectively, of the jaw means utilized by the tool.

In FIGURES 1–4 the tool 10 of the invention is shown basically to include a holder 11 and a needle 12. Holder 11 comprises a barrel 13, jaw means 14, sleeve 15, compression spring 16, and jaw release button 17. Barrel 13 is supplied with an interior shoulder portion 18 as a reaction means for compression spring 16. As illustrated, jaw means 14 and release button 17 engage the sleeve 15. While it is true that sleeve 15 and jaw means 14, or sleeve 15 and jaw release button 17, may comprise a unitary part, it is deemed preferably to manufacture these units separately. When these elements are separate parts, then it is preferable that they be threaded together although a press fit or other means of attachment might conceivably be used.

Jaw means 14 has a central opening 14' and may consist of a unitary part having a plurality of fingers 19. Each of the fingers 19 is exteriorly tapered at respective areas 20 so that the same may cooperate with the socket end 21 of barrel 13. These fingers 19 of jaw means 14 spring outwardly by virtue of the resilient constituency of the material thereof. The fingers are interiorly serrated in a conventional manner. The jaw means is strictly conventional except for the fact that it does include an exterior attachment portion 20', the purpose for which will be explained hereinafter.

Preferably, work member 12 is supplied with a stop means 21' which may take the form of an enlarged stop button adapted to engage that portion 21" of jaw means 14 which engages and therefore is interior of sleeve 15. Thus, the needle for work member 12 will not fall out of the holder 11 through inadvertence. The end 22 of barrel 13 which is remote from socket end 21 receives a jaw release button 23 which protrudes slightly thereof for selective depression. Button 23 also engages a sleeve 15. This engagement may generally take the form of a threaded connection.

As is illustrated, the compression spring 16 abuts the internal shoulder 18 of barrel 13 and also the inner end of button 23. (This jaw release button 23 will generally take the form of an internally threaded cap; other configurements are possible.)

Figure 5:
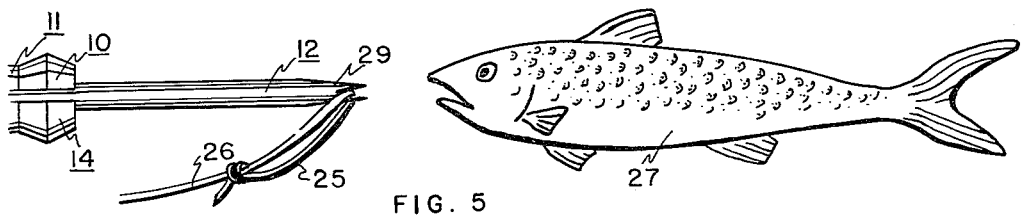
FIGURES 5 and 6 show the tool in fragmentary view only and illustrate the use of the tool in connection with the opeartion of threading fishing minnows.
Figure 6:
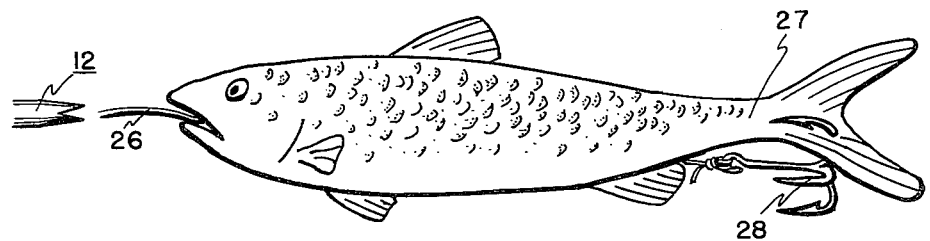

As before explained, the jaw means 14 is a unitary part, is made from a resilient, springly material of which many metals would be appropriate. When the user depresses the jaw release button 23 in the direction to the right of the viewer, the jaw means 14 is translated to the right along axis A of the device (e.g. barrel 13 and sleeve 15) so that the jaw means at the tapered portion 20 thereof will become disengaged with the socket end 21 of barrel 13. This permits the jaw to spring open somewhat so as to permit the needle or work member 12 to be translated to the right or to the left. If the work member is translated to the left it will be substantially enclosed within holder 11 for storage as illustrated in FIGURE 1. If the needle is translated to the right, then it may be used for inserting a leader through the mouth and out the anus of a minnow, for example. This operation is illustrated in fragmentary view in FIGURE 5, with the completed hook-up with the minnow being illustrated in FIGURE 6 by conventional three-prong hook engaging the looped end 25 of leader 26 and hooking through the tail of minnow 27.

It will be noted in the several figures that the needle 12 is provided with a forked end 26. This forked end is necessary for engagement of loop 25 of leader 26 so as to enable the user to insert the looped end of leader 26 through the minnow so the proper engagement with three-prong hook 28 may be realized. Additionally, it is seen that needle 12 is tapered at 29. This enables easy insertion through minnows and yet insures that the main portion of needle 12 will be sufficiently large in diameter so as to insure proper gripping thereof by jaw means 14 of holder 11.

Optionally provided is a conventional pocket clip 30 which may be conveniently mounted to holder 11. See FIGURE 1. Area 31 of barrel 13 may be serrated so that the device may be easily gripped.

It is thus seen that a useful tool is supplied for threading minnows, the work member or needle thereof being withdrawable for transport or extendable for operation. Stop 21 of needle 12 insures that the needle will not drop out of holder 11.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A tool including, in combination: a barrel having a central axis, a socket end, a remote end, and an interior spring reaction shoulder; exteriorly tapered, resilient, openable jaw means seated within said barrel socket end, being closed thereby, and translationally displaceable therefrom away from said barrel along said axis thereof for jaw means opening; a depressable, jaw release button disposed within and protruding from end of said barrel; a sleeve interposed between and connected to said button and circumscribingly engaging said jaw means; a compression spring circumscribing said sleeve and engaging said shoulder and said button; and a work member disposed through said jaw means, being engaged thereby, said work member being selectively translatable along said axis when said button is depressed so as to translate said jaw means away from said barrel socket end to enable said jaw means to open, said work member having stop means engageable with that portion of said jaw means disposed within said sleeve.

2. A tool including, in combination: a barrel having a central axis, a socket end, a remote end, and an interior spring reaction shoulder; exteriorly tapered, resilient, openable jaw means seated within said barrel socket end, being closed thereby, and translationally displaceable therefrom away from said barrel along said axis thereof for jaw means opening; a depressable, jaw release button disposed within and protruding from end of said barrel; a sleeve interposed between and connected to said button and circumscribingly engaging said jaw means; a compression spring circumscribing said sleeve and engaging said shoulder and said button; and a work member provided with a work end and an enlarged remote end disposed through said jaw means, being engaged thereby, said work member being selectively translatable along said axis when said button is depressed so as to translate said jaw means away from said barrel socket end to enable said jaw means to open, said sleeve and jaw means having an abutment at their juncture, engageable with said enlarged end of said work member, for stopping the travel of said work member outwardly from said barrel.

References Cited in the file of this patent

UNITED STATES PATENTS

| 326,737 | Hoffman | Sept. 22, 1885 |
| 891,573 | Sulzer | June 23, 1908 |
| 2,891,275 | Schuls | June 23, 1959 |

FOREIGN PATENTS

| 149,071 | Switzerland | Nov. 2, 1931 |